UNITED STATES PATENT OFFICE.

JACOB B. BESHORE, OF HARFORD COUNTY, MARYLAND, ASSIGNOR OF ONE-THIRD TO GEORGE C. PROCTOR AND ONE-THIRD TO STEVENSON ARCHER WILLIAMS, OF HARFORD COUNTY, MARYLAND.

BRICK.

1,003,693.     Specification of Letters Patent.     Patented Sept. 19, 1911.

No Drawing.     Application filed June 19, 1911. Serial No. 634,174.

*To all whom it may concern:*

Be it known that I, JACOB B. BESHORE, a citizen of the United States of America, residing in Harford county, State of Maryland, have invented certain new and useful Improvements in Bricks, of which the following is a specification.

This invention relates to a ceramic composition which may be produced in the form of bricks, tiles, hollow ware, conduits, etc., and to the process of producing the same.

The invention resides in the combination of constituents used, and in the proportions in which they are combined. Within the scope of my invention, these constituents may be procured from isolated sources and combined in the proportions named, or the desired combination may be produced from a single or from two or more natural slates or clays in which the desired elements occur in known proportions.

In the practice of my process to produce the ceramic, which is the result of my invention, I pulverize the materials used and if it is desired to cheapen the product at the expense of a certain degree of hardness, I mix with it a suitable filler in the desired proportions and treat by the soft mud, the stiff mud or the dry process and bake or burn in a suitable manner well-known in the brick-making art.

The object of the invention is the production of a brick or other ceramic of greater hardness than those now known to the trade. Such bricks are produced in all grades and varieties, salmon color, hard and vitrified.

In producing the vitrified brick, I prefer to use the dry process and it is important that the combination of constituents that I have described will produce an extremely hard brick, both in the common and vitrified grades.

The vitrified brick which I produce is as hard as any known substance, and will cut glass as smoothly as will the diamond point ordinarily used for that purpose.

The materials which I use and the proportions in which I prefer to combine them are as follows: silica 58 parts; protoxid of iron 11 parts; alumina 22 parts; magnesia 1 part and alkali 2 parts. These materials necessarily contain a certain amount of water, either in suspension or as water of crystallization. They also generally contain traces of tannic acid and oxid of manganese. These materials are combined in the proportions named and variously treated as above described in the manufacture of bricks, tiles, hollow ware, pipes, conduits, and the like, of extreme hardness. To cheapen the process, various materials may be added within the scope of my invention, but these serve to reduce the hardness of the product.

It will be noted that the composition which I use is particularly rich in protoxid of iron. This serves as a flux and facilitates the combination of the alumina and silica. It will also be noted that there is a large amount of silica present. This makes it possible to burn the brick at a high temperature. That which I use is about 2050° F. on the bricks and from 2300° F to 2500° F. in the furnace. By experiment I find that by increasing the proportions of protoxid of iron in the mixture up to 11 parts which I have named I thereby greatly increase the hardness of the brick and the increased proportion of alumina seems to give added toughness. The alkali to which I have referred occurs in the form of sodium and potassium oxids. This serves as an additional flux and later escapes in gaseous form. The nature of the filler to which I have referred is immaterial as its only function is to cheapen the product and this is generally at a greater or less loss of efficiency or hardness.

Having thus described my invention, what I claim is—

A composition for making bricks, which consists of the following constituents in the proportions named: silica 58 parts; protoxid of iron 11 parts; alumina 22 parts; magnesia 1 part; and alkali 2 parts.

Signed by me at Baltimore, Maryland this 14 day of June 1911.

JACOB B. BESHORE.

Witnesses:
   ZELLA KUHN,
   EDWIN F. SAMUELS.